United States Patent
Uehara et al.

(10) Patent No.: US 6,768,631 B2
(45) Date of Patent: Jul. 27, 2004

(54) METHOD FOR PREPARING POROUS CARBON MATERIAL, POROUS CARBON MATERIAL AND ELECTRICAL DOUBLE LAYER CAPACITOR USING THE SAME

(75) Inventors: Kenichi Uehara, Chiba (JP); Yoshihisa Murata, Chiba (JP)

(73) Assignee: JFE Steel Corporation (JP)

( * ) Notice: Subject to any disclaimer, the term of this patent is extended or adjusted under 35 U.S.C. 154(b) by 473 days.

(21) Appl. No.: 09/937,198

(22) PCT Filed: Jan. 26, 2001

(86) PCT No.: PCT/JP01/00504

§ 371 (c)(1),
(2), (4) Date: Sep. 21, 2001

(87) PCT Pub. No.: WO01/56924

PCT Pub. Date: Aug. 9, 2001

(65) Prior Publication Data

US 2003/0086860 A1 May 8, 2003

(30) Foreign Application Priority Data

Jan. 31, 2000 (JP) .......................................... 2000-023099
Dec. 18, 2000 (JP) .......................................... 2000-384054

(51) Int. Cl.$^7$ ................................................. H01G 9/00
(52) U.S. Cl. ....................... 361/502; 361/508; 423/44 R
(58) Field of Search ................................. 361/502, 508, 361/509, 516; 423/44 R

(56) References Cited

U.S. PATENT DOCUMENTS 5,344,724 A * 9/1994 Ozaki et al. ................... 429/94

\* cited by examiner

*Primary Examiner*—Anthony Dinkins
(74) *Attorney, Agent, or Firm*—Piper Rudnick LLP

(57) ABSTRACT

The present invention provides a method of producing a porous carbon material in which a soft carbon-type carbon material is activated with alkali in the presence of a carboxylic acid ion and at least one metal ion selected from the group consisting of iron ions, cobalt ions, manganese ions and nickel ions. The method is capable of industrially producing a porous carbon material having a specific surface area per unit volume of 1000 (m$^2$/cm$^3$) or more in high yield and at low cost. The packing density of the porous carbon material can also be increased, and a high capacitance per unit volume can be obtained when the porous carbon material is used as a polarizable electrode material. Therefore, the present invention also provides an electrical double layer capacitor having a small size and a large capacitance, and using the porous carbon material as a polarizable electrode.

8 Claims, No Drawings

METHOD FOR PREPARING POROUS CARBON MATERIAL, POROUS CARBON MATERIAL AND ELECTRICAL DOUBLE LAYER CAPACITOR USING THE SAME

TECHNICAL FIELD

The present invention relates to a porous carbon material and a method of producing the same, and an electrical double layer capacitor using the porous carbon material. Particularly, the present invention provides a porous carbon material which has a large specific surface area per volume (referred to as a "volume specific surface area" hereinafter), and which significantly increases in capacitance per unit volume when used as a polarizable electrode material, and an industrial method of producing the porous carbon material in high yield and at low cost. Also, the present invention provides an electrical double layer capacitor using the porous carbon material and having a large capacitance even with a small size.

BACKGROUND ART

In an interface between two different phases including a solid electrode and an electrolytic solution, positive and negative charges are arranged and distributed with a very short distance therebetween. For example, with the positively charged electrode, anions in the solution are arranged for supplement for the charge. A layer caused by the charge arrangement is referred to as an "electrical double layer". The electrical double layer is formed by non-Faradaic reaction without electron transfer between the electrode and the ions. The capacitance expressed at the electrode interface accompanying the formation of the electrical double layer is referred to as "electrical double layer capacitance", and an energy storage device utilizing the capacitance is referred to as an "electrical double layer capacitor".

The electrical double layer capacitor has the properties that it has excellent instantaneous charge-discharge performance, and causes less deterioration in charge-dischahrge cycle life performance. Therefore, the electrical double layer capacitor is useful as a backup power supply for an electronic apparatus such as a microcomputer comprising IC memory, and a power supply for an electric vehicle.

In the electrical double layer capacitor having a structure in which an electrolyte is held between a pair of polarizable electrodes, stored capacitance C is represented by the following equation (1):

$$C=\int [\epsilon/(4\pi\delta)]ds \quad (1)$$

(wherein $\epsilon$: dielectric constant of electrolytic solution, $\delta$: distance between the electrode surface and the ion center, s: surface area of the electrode interface.)

Therefore, by using a polarizable electrode material having a large specific surface area, an electrical double layer capacitor having a large capacitance can be obtained.

A known material with a large specific surface area which can be used as the polarizable electrode is activated carbon. The activated carbon is generally produced by an oxidizing gas activation method comprising oxidizing a waste resin, a pulp production residue, coal, coal cokes, wood, coconut shell, or the like, which is used as a raw material, with stream, air, oxygen, $CO_2$, or the like to form pores.

Since the oxidizing gas activation method uses no special chemical and has no problem of equipment corrosion, the method is advantageous from the viewpoint of cost.

However, it is known that activated carbon having a large specific surface area cannot be efficiently obtained by oxidizing gas activation. For example, in an attempt to obtain activated carbon having a surface area per unit weight (referred to as a "weight specific surface area" hereinafter) of as large as about 1500 to 3000 ($m^2/g$), which is required for the polarizable electrode material, the yield is as low as 20% or less.

On the other hand, a chemical activation method of forming pores by using a chemical is also known. Particularly, an alkali activation method using alkali can obtain activated carbon having a surface area of 1500 to 3000 ($m^2/g$) per unit weight in a yield of 60% or more. The alkali activation method can also increase the specific surface area by increasing the amount of the alkali used. For example, by using alkali in an amount of about 3 to 5 times (mass ratio) as large as the raw material, a specific surface area of 2000 $m^2/g$ or more can be obtained.

In recent years, electronic apparatus, electric vehicles, etc. have been required to be decreased in weight and size, and the energy density of the carbon material used for these applications has been increasingly required to be increased.

In an attempt to decrease the weight and size of the electrical double layer capacitor, therefore, it is required to increase not only the capacitance per unit mass (referred to as the "weight specific capacitance" hereinafter), but also the capacitance per unit volume (referred to as the "volume specific capacitance" hereinafter). More specifically, in application of the electrical double layer capacitor, the target value of the capacitance per unit volume is as high as 20 $F/cm^3$ or more. The capacitance per unit volume ($F/cm^3$) is obtained by multiplying the capacitance per unit mass (F/g) by a packing density.

The above equation (1) indicates that the capacitance per unit mass (F/g) increases as the surface area per unit mass increases. However, in fact, the capacitance per unit volume ($F/cm^3$) is liable to be saturated when the surface area per unit weight is about 2000 ($m^2/g$), and inversely decreased when the surface area per unit weight exceeds about 2500 ($m^2/g$). Therefore, the target value of the capacitance per unit volume of 20 $F/cm^3$ or more cannot be easily achieved by the conventional method of increasing the specific surface area.

This is possibly mainly due to the fact that the packing density is decreased by increasing the specific surface area.

Another conventional method for improving the capacitance per unit volume has been proposed.

Namely, it has been proposed to secure a high packing density by using meso carbon micro beads as an alkali activation raw material (Application No. 2634658). However, it is disclosed that by the alkali activation method using meso carbon micro beads having smooth surfaces, a high packing density of 0.90 $g/cm^3$ can be achieved with a surface area per unit weight of 470 ($m^2/g$), but when the surface area per unit weight is increased to 1000 ($m^2/g$) or more by activation, the packing density can be increased to only about 0.50 $g/cm^3$ at most. Furthermore, in an attempt to increase the surface area per unit weight to about 2000 ($m^2/g$), only a packing density of as low as 0.46 $g/cm^3$ can be obtained.

The alkali activation method is basically a method of producing micro pores having diameters of less than 2.0 nm to increase the specific surface area. For example, Japanese Unexamined Patent Publication No. 1-230414 discloses that in alkali activation of meso carbon micro beads under an inert atmosphere, the ratio of micro pores of less than 2.0 nm is 85% or more of the total pore volume. This publication also discloses in examples that in activation with potassium hydroxide in an amount of 3 to 5 times as large as the meso carbon micro beads, activated carbon having a weight specific surface area of 1500 to 3000 ($m^2/g$) can be obtained. In this case, the ratio of the weight specific surface area of mesopores having diameters of 2.0 nm or more is only about 0.8 to 3.0% of the total specific surface area.

Pores of the polarizable electrode material for the electrical double layer capacitor, which are effective to adsorb and desorb an electrolyte, are generally mesopores of 2.0 nm or more. However, the conventional alkali activation method is difficult to produce many mesopores of 2.0 nm or more.

Although the alkali activation can easily secure a certain weight specific surface area, it requires a large amount of alkali, and has the problems of high chemical cost and equipment corrosion, thereby causing difficulties in industrial mass production.

Therefore, a method has been proposed, in which a metal or a salt thereof other than alkali metals is added in oxidizing gas activation for activating a carbon material with steam or the like to form mesopores.

For example, Yoshizawa et al. (Tanso, 181, 8–13 (1998)) disclose steam activation for forming mesopores in which acetylacetonato-complex salt of iron (III), nickel (II), cobalt (II) is added to coal. By this steam activation method, activated carbon supporting metal oxides can be obtained.

Japanese Unexamined Patent Publication Application No. 10-297912 discloses carbonization or activation in a weakly oxidizing atmosphere in which a transition metal or a compound of a transition metal such as Ti, Cr, Mn, Fe, Co, Ni, Cu, W, or the like is added to facilly graphitizable carbon such as cokes, or hardly graphitizable carbon such as phenol resin. In this method, the pore diameter distribution is maximized to obtain meso carbon. However, this publication discloses that although mesopores can be formed regardless of the type of the metal added, the specific surface area of cokes is less increased, and the specific surface area of the phenol resin is not so increased.

Japanese Unexamined Patent Publication Application No. 10-172870 teaches a method in which activated carbon, activated carbon fibers or carbon black is activated with steam together with a metal or metal compound to disperse fine particles of the metal or metal oxide, imparting conductivity.

The present invention has been achieved for solving the above-described problems, and an object of the present invention is to provide a porous carbon material which has a volume specific surface area of 1000 ($m^2/cm^3$) or more and which significantly increases in capacitance per unit volume when used as a polarizable electrode material, and an industrial method capable of producing the porous carbon material in high yield and at low cost. Another object of the present invention is to provide an electrical double layer capacitor using the porous carbon material and having a large capacitance even with a small size.

DISCLOSURE OF INVENTION

The inventors performed study about an industrial method capable of producing a porous carbon material suitable as an electrode material for a high-performance electrical double layer capacitor. As a result, it was found that a porous carbon material having a large volume specific surface area and significantly increasing in capacitance per unit volume when used as a polarizable electrode could be obtained by alkali activation using a soft carbon-type carbon material as a raw material in coexistence with specified metal ion and a carboxylic acid ion. It was also found that this method uses a smaller amount of alkali than a conventional method, and thus the problems of chemical cost and equipment corrosion can be resolved. These findings resulted in achievement of the present invention.

Namely, the present invention relates to a method of producing a porous carbon material comprising activating a soft carbon-type carbon material with alkali in the presence of a carboxylic acid ion and at least one metal ion selected from the group consisting of iron ions, cobalt ions, manganese ions and nickel ions.

In this production method, the soft carbon-type carbon material preferably comprises at least one selected from mesophase microspheres and bulk mesophases.

The metal ion is preferably supplied by a metal chloride.

The carboxylic acid ion is preferably at least one ion selected from an acetic acid ion, a citric acid ion, and a benzoic acid ion.

In the present invention, the porous carbon material is obtained by any one of the above production methods, and has a surface area per unit volume is 1000 $m^2/cm^3$ or more. The porous carbon material preferably has a packing density of 0.5 $g/cm^3$ or more, which is obtained by a predetermined packing method.

Furthermore, the present invention provides an electrical double layer capacitor using the porous carbon material as a polarizable electrode material. The electrical double layer capacitor preferably has an capacitance per unit volume of 20 $F/cm^3$ or more.

BEST MODE FOR CARRYING OUT THE INVENTION

The present invention will be described in further detail below.

In the present invention, a soft carbon-type carbon material is activated with alkali in the presence of a carboxylic acid ion and at least one metal ion selected from the group consisting of iron ions, cobalt ions, manganese ions and nickel ions.

At this time, as the soft carbon-type carbon material, at least one material selected from the group consisting of mesophase microspheres and bulk mesophases is preferably used. Known materials can be widely used as the mesophase microspheres and bulk mesophases, and particularly, the material is not limited. However, the material preferably has a particle diameter in the range of 5 to 100 $\mu$m, and more preferably 5 to 40 $\mu$m.

As the raw material for producing the mesophase microspheres and bulk mesophases, for example, pitch such as coal tar or pitch, petroleum heavy oil or pitch, or the like can be used. Such pitch is heated, for example, at 350 to 500° C. in a nitrogen stream for 0.5 to 10 hours to produce the mesophase microspheres in the pitch with proceeding of heating, and then produce the bulk mesophases due to agglomeration of the mesophase microspheres. Therefore, the mesophase microspheres and/or bulk mesophases may be produced by appropriately selecting the heating conditions according to demand. After heating, the mesophase microspheres and/or bulk mesophases can be obtained from the pitch by a solvent separation method using, for example, a solvent such as quinoline, tar oil, or the like.

The mesophase microspheres and the bulk mesophases used as the activation raw material in the present invention are described in detail in, for example, Japanese Unexamined Patent Publication Application Nos. 1-230414 and 8-85794 and Patent No. 2950781. In the present invention, the mesophase microspheres and the bulk mesophases can be used as the raw material, but commercial materials may be used.

In the present invention, either of the mesophase microspheres and bulk mesophases may be used, or a mixture thereof may be used.

Such a soft carbon-type carbon material is a graphite precursor, and thus graphitization of the material proceeds in the activation process to easily form a graphite structure, thereby preferably forming a micro structure with low internal resistance after activation.

In the present invention, alkali activation is performed in the presence of the metal ion and carboxylic acid ion.

The metal ion used in the present invention is an ion of at least one metal selected from iron, cobalt, manganese, and nickel. The valence of the metal ions is not limited, and it may be, for example, divalent or trivalent.

The form for supplying the metal ions may be a simple metal, a metal compound such as a hydroxide or the like, or an inorganic acid salt such as halide, carbonate, nitrate, phosphate, or the like. Alternatively, the supply form may be an organic metal compound such as cobalt cyanide, or the like, or an organic acid salt such as metal phenolate, metal carboxylate, or the like. From the viewpoint of ease of dissociation and handling, a halide, a hydroxide, and an organic acid metal salt are preferably used. Particularly, the use of a metal carboxylate can achieve the coexistence with the carboxylic acid ion, which is a requirement of the present invention.

In the present invention, the metal ions can be supplied in an amount of about 0.01 to 20% by mass in terms of metal relative to the soft carbon-type carbon material. However, in consideration of the influence of the amount of the residual metal on the capacitance, the upper limit is preferably about 10% by mass, more preferably 5% by mass.

In the method of the present invention, the carboxylic acid ion is caused to coexist. Preferred examples of such carboxylic acid ion includes an acetic acid ion, a citric acid ion, and a benzoic acid ion. The carboxylic acid ion may be used in a single type or a combination of plural types.

Although the amount of the carboxylic acid ion used in the present invention is not limited, the molar amount of the carboxylic acid ion supplied is preferably about 1 to 10 times as large as the amount of the metal ion.

The form for supplying the carboxylic acid ions is not limited, and a carboxylic acid or carboxylate such as alkali carboxylate or the like may be used. From the viewpoint of ease of dissociation in the activation system and handling, the alkali carboxylate is preferably used. For example, the alkali carboxylate such as sodium acetate is particularly preferred because setting of activation conditions is facilitated due to coexistence with the alkali metal used in alkali activation. Also, for example, iron acetate may be added to form the above-described metal compound of carboxylic acid in the activation reaction system. In this case, the metal carboxylate may be supplied regardless of the salt type as long as it is used under conditions in which the carboxylic acid metal compound can be formed from the metal ion and the carboxylic acid ion.

The metal ion and the carboxylic acid ion may be supplied in the form of an aqueous solution. Alternatively, a carboxylic acid metal compound such as iron acetate or the like, which is previously formed from the metal ion and the carboxylic acid ion, may be supplied, and the ion may be supplied in coexistence with a solvent such as acetone.

In the present invention, the alkali activation can be carried out in coexistence of the ions by the same method as a conventional alkali activation.

The alkali compound is not limited, and it may be used in a single type or a combination of plural types of alkali compounds. KOH, NaOH, CsOH, and the like may be preferably used.

In the present invention, the amount of the alkali used depends upon the desired final specific surface area, and the amount may be about 0.1 time (mass ratio) as large as the amount of the soft carbon-type carbon material used as the raw material in some cases. However, in order to obtain a weight specific surface area of about 2000 $m^2/g$, the amount of KOH may be about 2 times as large as the amount of the soft carbon-type carbon material. The necessary amount of the alkali is conventionally about 3 to 5 times.

In the present invention, activation is preferably performed in an inert atmosphere of nitrogen gas, argon gas, or the like, to suppress the production of metal oxide. As a result, a decarbonizing effect can be further obtained.

In activation of the present invention, the soft carbon-type carbon material, the metal ion source, the carboxylic acid ion source, and if required, water and a solvent, are used for forming a slurry. For example, the metal ion and the carboxylic acid salt are used in an aqueous solution to easily obtain the slurry. The addition order of the materials is not limited.

Then, the thus-obtained slurry is dried to obtain a dry mixture, and then heated at a temperature of 300 to 1500° C., preferably 500 to 900° C., in the inert atmosphere for activation. During the activation, any one of various heating equipments such as a rotary kiln, a fluidized bed, a moving bed, a fixed bed, or the like can be used. The activation heating time is generally about 10 minutes to 24 hours. In the heating step, the temperature may be increased at a constant rate and then kept at a desired temperature, or may be kept several times in the course of heating until the final temperature is obtained.

After activation, the mixture is neutralized with a hydrochloric acid solution, and then washed with ion exchanged water or the like to obtain the porous carbon material.

The above-described method of producing a porous carbon material of the present invention can obtain the porous carbon material which has a volume specific surface area of 1000 ($m^2/cm^3$) or more and many pores of 2.0 nm or more, and which exhibits high capacitance not only per mass but also per volume with a high packing density when used as a polarizable electrode.

The porous carbon material obtained by the production method of the present invention is characterized in that a packing density of as high as 0.5 $g/cm^3$ or more can be obtained by a predetermined packing method of the present invention. A packing density of 0.6 $g/cm^3$ or more can also be obtained.

The predetermined packing method and the method of measuring the packing density of the present invention will be described in detail below with reference to examples.

The average pore diameter (BET method) of the porous carbon material is preferably 1.8 nm or more, more preferably 2.0 nm or more. The content of the pores of 2.0 nm or more is preferably 15% or more.

The weight specific surface area (BET method) of the porous carbon material is preferably about 500 to 2000 ($m^2/g$), more preferably about 1000 to 2000 ($m^2/g$).

As a result of X-ray diffraction analysis (X-ray diffraction analyzer 1500 produced by Rigaku Co., Ltd., conditions including CuKα. 40 kV, and 80 mA) of the state of iron ion present as the metal ion in the porous carbon material obtained by the above-described alkali treatment, an iron carbide peak ($Fe_3C$) was observed.

Since the iron carbide $Fe_3C$ is orthorhombic, it is understood that the difference between graphite crystal (hexagonal) and orthorhombic crystal structures influences the formation of the pore structure of the present invention.

By the production method of the present invention, the porous carbon material having a volume specific surface area of as high as about 1000 ($m^2/cm^3$) can also be obtained in a yield of 80% or more. By an example of conventional alkali activation methods, a porous carbon material having a weight specific surface area of about 2000 ($m^2/g$) can be obtained in a yield of up to about 50 to 60%.

The method of present invention also exhibits the surprising effect that the amount of the alkali used for obtaining the porous carbon material having a specific surface area equivalent to a conventional method by using the same material as the conventional method can be decreased to about a half the amount of the alkali used in the conventional method. For example, in order to obtain a weight specific surface area of about 2000 $m^2/g$, the amount of the alkali used in the present invention may be about 2 times the carbon raw material, while the amount of the alkali used in the conventional method must be about 4 times.

The porous carbon material obtained in the present invention exhibits high capacitance. Therefore, the porous carbon material is suitable as a polarizable electrode material for an electrical double layer capacitor. The present invention also provides an electrical double layer capacitor using the porous carbon material as the polarizable electrode material.

The porous carbon material of the present invention was molded in a polarizable electrode, and evaluated with respect to the capacitance of an electrical double layer capacitor. As a result, it was found that by using the porous carbon material of the present invention, an electrical double layer capacitor having a high weight specific capacitance as well as a high volume specific capacitance can be obtained.

In evaluation of the weight specific capacitance, the weight specific capacitance of the electrical double layer capacitor of the present invention is as high as 30 to 32 (F/g) or more, which is higher than a capacitor using a porous carbon material obtained by the conventional alkali activation method as a polarizable electrode. In evaluation of the volume specific capacitance, since the packing density of the porous carbon material of the present invention can be increased in forming the polarizable electrode, the electrical double layer capacitor exhibiting a volume specific capacitance of as high as 20 ($F/cm^3$) or more can be obtained even when the weight specific surface area of the porous carbon material itself is less than 2000 ($m^2/g$).

An electrical double layer capacitor using a porous carbon material formed by the conventional alkali activation method is generally evaluated to be difficult to obtain a volume specific capacitance of 20 ($F/cm^3$) or more. For example, even when the same carbon raw material is used, the packing density of the porous carbon material obtained by the conventional alkali activation method is as low as 0.4 to 0.5 $g/cm^3$ even with a weight specific surface area of 2000 ($m^2/g$) or more. Therefore, in the electrical double layer capacitor obtained by the conventional method, the weight specific capacitance exceeds 30 (F/g), while the volume specific capacitance does not reach 20 ($F/cm^3$). Also, of porous carbon materials obtained by the conventional method, a material exhibiting a high packing density has a weight specific surface area of about 1500 ($m^2/g$), and an electrical double layer capacitor has a weight specific capacitance of as low as about 25 (F/g) at most, and thus has a volume specific capacitance of less than 20 ($F/cm^3$).

The porous carbon material obtained in the present invention corresponds to the shape of the mesophase microspheres or bulk mesophases of the starting raw material and has an average particle diameter of 5 to 100 μm. In order to form the polarizable electrode of the electrical double layer capacitor using the porous carbon material, the polarizable electrode can be produced according to a general method using the material.

Generally, a binder and a conductive material are appropriately added to the porous carbon material according to demand, and the resultant mixture is molded in a circular disk or rectangular sheet, thereby forming a porous carbon material layer.

As the binder, polytetrafluoroethylene, polyvinylidene fluoride, or the like can be used. The binder can be generally used in an amount of 0.1 to 20% by mass relative to the porous carbon material with an excessively large amount of the binder added, the internal resistance of a battery is increased, while with the excessively small amount of the binder, bonding between the respective porous carbon material particles and bonding between the porous carbon material and a current collector are liable to be insufficient.

In the porous carbon material comprising microspheres, the spheres can secure electrification points only due to point contacts, and thus the conductive material is added for forming a polarizable electrode material. As the conductive material, carbon black is generally used according to demand. The conductive material is used in an amount of about 3 to 20% by mass relative to the porous carbon material.

The polarizable electrode has a structure comprising a conductive current collecting material layer formed on one side of the porous carbon material layer. The conductive current collecting material layer may be compression molded at the same time the porous carbon material layer is formed by using the mixture of the porous carbon material, the binder and the conductive material. Alternatively, the collecting material may be electrically connected to one side of the porous carbon material layer formed by compression molding or the like.

In order to simultaneously form the porous carbon material thin layer having a thickness of about 10 to 200 μm and the conductive collecting material layer comprising a metal plate, the binder is preferably used. In an example using polyvinylidene fluoride as the binder, a preferred method comprises dissolving the binder in a solvent such as N-methyl-2-pyrrolidone, adding the porous carbon material, and if required, the conductive material, to the resultant solution to form a paste, uniformly coating the paste on the current collector, and then drying the paste.

It is also possible to increase the packing density of the porous carbon material layer by pressing at room temperature or under heating after drying.

In producing a porous carbon material molded product having the shape of a disk or thick sheet, polytetrafluoroethylene is preferably used as the binder. In this case, a preferred method comprises kneading the porous carbon material, the binder, and if required, the conductive material, at room temperature or under heating, and compression-molding the resultant mixture at room temperature or under heating.

The method of electrically connecting the current collector to the porous carbon material layer is also preferably used. In this case, the method of spraying a molten metal such as aluminum or the like to form the current collector, or the method of pressure-bonding the current collector comprising a metal foil or metal net made of aluminum or the like may be used.

The unit cell of the electrical double layer capacitor is formed by opposing a pair of the polarizable electrodes obtained as described above with a permeable separator comprising a nonwoven fabric or another porous material provided therebetween according to demand, and immersing the pair of the polarizable electrodes in an electrolytic solution. The pair of the polarizable electrodes may be either the same or different. In use of the electrical double layer capacitor, the unit cell is used singly, or a plurality of the unit cells are connected in series and/or parallel.

As the electrolytic solution, either a non-aqueous solvent system or an aqueous system can be used.

The non-aqueous solvent-system electrolytic solution is obtained by dissolving the electrolyte in an organic solvent. Examples of the organic solvent which can be used include ethylene carbonate, propylene carbonate, γ-butyl lactone, dimethylsulfoxide, dimethylformamide, acetonitrile, tetrahydrofuran, dimethoxyethane, and the like. A mixture comprising at least two solvents may be used.

Examples of the electrolyte include $(C_2H_5)_4PBF_4$, $(C_3H_7)_4 PBF_4$, $(C_2H_5)_4NBF_4$, $(C_3H_7)_4NBF_4$, $(C_2H_5) LiBF_4$, $LiClO_4$, $LiCF_3SO_3$, and the like.

As the electrolyte for the aqueous-system electrolytic solution, NaCl, NaOH, HCL, $H_2SO_4$, or the like can be used.

EXAMPLES

The present invention is described in detail below with reference to examples, but the present invention is not limited to these examples.

Examples 1 to 6

The predetermined amounts of ferric chloride aqueous solution, acetone (not used in Example 6), sodium acetate and potassium hydroxide shown in Table 1 were added to 20 g of mesophase microspheres (produced by Kawasaki Steel Corporation, trade name KMFC, average particle diameter 17 μm), and uniformly mixed to form a slurry, followed by drying at 80° C. for 3 hours and at 160° C. for 24 hours.

Next, the resultant mixture was activated by heating at 850° C. under an argon stream for 3 hours. The microsphere sample which was made porous by activation was neutralized with hydrochloric acid, and then washed with ion exchanged water until the washing solution exhibited neutrality. The yield was determined by the ratio (%) by weight of the obtained porous carbon material to the raw material.

The packing density and pore structure of the obtained porous carbon material were measured as follows to evaluate the examples and comparative examples. The results are shown in Table 1.

(1) Packing Density

The packing density means "packing density obtained by a predetermined packing method", and was measured by the following method.

1 mg of polytetrafluoroethylene (PTFE 7J, produced by Du Pont-Mitsui Fluorochemicals) was mixed with 80 mg of carbon material, and the resultant mixture was compression molded (pressure 148 GPa) into a disk having a diameter of 13 mm. The packing density (g/cm³) was calculated from the diameter, the thickness and the mass of the disk.

(2) Pore Structure

The specific surface area and the pore diameter were calculated by the BET method using ASAP2400 produced by Micrometrics Co., based on an adsorption isotherm of $N_2$ adsorption and desorption at 77K.

The pore diameter was calculated by 4× (pore volume)/ (BET specific surface area).

Comparative Examples 1 to 4

The same alkali activation method as Example 1 was repeated except that a ferric chloride aqueous solution, sodium acetate and acetone were not used, and potassium hydroxide was used in the amount shown in the table to obtain porous carbon materials.

The activation time was 30 minutes in Comparative Example 1; the activation time was 1 hour in Comparative Example 2; the activation time was 3 hours in Comparative Examples 3 and 4. The results are shown in Table 1.

Examples 7 to 9

The same method as Example 1 was repeated except that 20 g of bulk mesophase (average particle diameter 25 μm) was used in place of the mesophase microspheres to obtain porous carbon materials. The results are shown in Table 1.

Comparative Example 5

The same alkali activation method as Comparative Example 3 was repeated except that the same bulk mesophase as Examples 7 to 9 was used in place of the mesophase microspheres to obtain porous carbon materials. The results are shown in Table 1.

Comparative Example 6

The same mesophase microspheres as Example 1 were activated with steam to obtain a porous carbon material. The results are shown in Table 1.

Comparative Example 7

The properties of commercial activated carbon from coconut shell (activated with steam, capacitor grade), and the properties of a polarizable electrode material comprising the activated carbon are shown in Table 1.

Examples 10 to 19 and Comparative Examples 8 to 13

The same method as Example 1 was repeated except that the mesophase microspheres, metal ions, carboxylic acid ions shown in Table 2 to 4 were used to obtain porous carbon materials. The results are shown in Tables 2 to 4.

The porous carbon materials obtained by activation in Examples 1 to 13 and 17 to 19 (using iron ions) were subjected to analysis of the state of the present metal by X-ray diffraction analysis (X-ray diffraction analyzer 1500 produced by Rigaku Co., Ltd., under conditions of CuKα, 40 kV, and 80 mA). As a result, $Fe_3C$ was observed.

An electrical double layer capacitor was produced by using each of the porous carbon materials obtained in the Examples and the Comparative Examples, and the performance of the capacitor was evaluated.

Formation of Electrode 10 mg of carbon black and 3 mg of polytetrafluoroethylene were added to 80 mg of porous carbon material, and mixed in a dry manner, and the resultant mixture was then molded into a disk having a diameter of 13 mm under pressure (148 GPa) by using an aluminum mesh as a current collector to form a polarizable electrode material. The thus-formed polarizable electrode material was dried at 160° C. under reduced pressure (133.3 Pa) for 6 hours.

Formation of Electrical Double Layer Capacitor

Porous polypropylene (pore diameter 0.20 μm) was held between a pair of the polarizable electrode materials formed as described above in a glove box in which high-purity argon is flowed and a dew point is kept at −60° C., and the resultant component was incorporated into a bipolar cell produced by Hosen Co., Ltd. The cell was then filled with an electrolytic solution to form a cell.

As the electrolytic solution, a solution obtained by dissolving 1 M of tetraethylammonium tetrafluoroborate $((C_2H_5)_4NBF_4)$ in propylene carbonate was used.

Measurement of Capacitance

Charge and discharge were measured by constant-current charge with 0.5 mA/cm² and then constant-voltage charge for 2 hours after the potential reached 2.4 V using a Hokuto Denko charge-discharge test equipment (HJR-110mSM6).

Then, constant-current discharge with 0.5 MA/cm² was performed to the final voltage 0 V.

This cycle was repeated 10 times.

The capacitance was calculated as following:

The discharge energy (total discharge energy (W·s) obtained by discharge voltage×time integration of current) was determined from a discharge curve (discharge voltage-discharge time) at the third cycle to determine the capacitance by using the following equation:

$$\text{Capacitance (F)} = 2 \times \text{discharge energy (W·s)} / (\text{discharge start voltage (V)})^2$$

The obtained capacitance was divided by the mass (positive electrode+negative electrode, unit: g) of the carbon material of the polarizable electrode material to determine the capacitance per unit mass.

The capacitance per unit mass was multiplied by the packing density (g/cm³) of the polarizable electrode material to obtain the capacitance per unit volume (F/cm³).

TABLE 1-1

| | | | Example | | | | | | Comparative Example | | | |
|---|---|---|---|---|---|---|---|---|---|---|---|---|
| | | | 1 | 2 | 3 | 4 | 5 | 6 | 1 | 2 | 3 | 4 |
| Blend | Carbon material | Type | MF | MF | MF | MF | MF | MF | MF | MF | MF | MF |
| | | [g] | 20 | 20 | 20 | 20 | 20 | 20 | 20 | 20 | 20 | 20 |
| | Ferric chloride | [g] | 0.97 | 1.94 | 2.91 | 3.88 | 4.85 | 1.94 | — | — | — | — |
| | Sodium acetate | [g] | 0.88 | 1.76 | 2.64 | 3.52 | 4.40 | 1.76 | — | — | — | — |
| | Acetone | [g] | 1.25 | 2.50 | 3.75 | 5.00 | 6.25 | — | — | — | — | — |
| | Potassium hydroxide | [g] | 40 | 40 | 40 | 40 | 40 | 40 | 80 | 80 | 80 | 80 |
| Porous carbon material | Yield | [%] | 82.1 | 87.5 | 85.1 | 85.4 | 85.2 | 89.4 | 85.1 | 74.2 | 63.6 | 79.7 |
| | Volume specific surface | [m²/cm³] | 1042 | 1066 | 1071 | 1082 | 1075 | 1040 | 767 | 874 | 842 | 1035 |
| | Weight specific surface | [m²/g] | 1680 | 1747 | 1815 | 1773 | 1762 | 1650 | 1023 | 1482 | 2552 | 1344 |
| | Pore diameter | [nm] | 2.00 | 2.03 | 2.07 | 2.07 | 2.14 | 2.06 | 2.00 | 2.07 | 2.47 | 2.04 |
| | Packing density | [g/cm³] | 0.62 | 0.61 | 0.59 | 0.61 | 0.61 | 0.63 | 0.75 | 0.59 | 0.33 | 0.77 |
| Capacitor | Capacitance per mass | [F/g] | 35.5 | 36.2 | 37.1 | 36.2 | 34.5 | 34.7 | 7.3 | 17.1 | 43.1 | 25.2 |
| | Capacitance per volume | [F/cm³] | 22.0 | 22.1 | 22.0 | 22.1 | 21.0 | 21.8 | 5.5 | 10.1 | 14.0 | 19.3 |

MF: Mesophase microspheres
BM: Bulk mesophases
Coconut shell: Activated carbon from coconut shell
Comparative Example 6: Steam activation (33% saturated $H_2O/N_2$, 900° C., 1 hr)

TABLE 1-2

| | | | Example | | | Comparative Example | | |
|---|---|---|---|---|---|---|---|---|
| | | | 7 | 8 | 9 | 5 | 6 | 7 |
| Blend | Carbon material | Type | BM | BM | BM | BM | BM | Coconut shell |
| | | [g] | 20 | 20 | 20 | 20 | 20 | — |
| | Ferric chloride | [g] | 0.97 | 2.42 | 4.85 | — | 2.42 | — |
| | Sodium acetate | [g] | 0.88 | 2.20 | 4.40 | — | 2.20 | — |
| | Acetone | [g] | 1.25 | 3.13 | 6.25 | — | 3.13 | — |

TABLE 1-2-continued

|  |  |  | Example | | | Comparative Example | | |
| --- | --- | --- | --- | --- | --- | --- | --- | --- |
|  |  |  | 7 | 8 | 9 | 5 | 6 | 7 |
|  | Potassium hydroxide | [g] | 40 | 40 | 40 | 40 | — | — |
| Porous carbon material | Yield | [%] | 75.0 | 81.7 | 80.3 | 80.9 | 21.0 | — |
|  | Volume specific surface | [m²/cm³] | 1258 | 1202 | 1266 | 1029 | 392 | 941 |
|  | Weight specific surface | [m²/g] | 1997 | 2038 | 2009 | 1390 | 545 | 1681 |
|  | Pore diameter | [nm] | 1.97 | 1.89 | 1.85 | 1.99 | 3.52 | 2.04 |
|  | Packing density | [g/cm³] | 0.63 | 0.59 | 0.63 | 0.74 | 0.72 | 0.56 |
| Capacitor | Capacitance per mass | [F/g] | 33.4 | 37.5 | 32.1 | 23.4 | 11.2 | 22.9 |
|  | Capacitance per volume | [F/cm³] | 21.0 | 22.2 | 20.2 | 17.3 | 8.0 | 12.7 |

MF: Mesophase microspheres
BM: Bulk mesophases
Coconut shell: Activated carbon from coconut shell
Comparative Example 6: Steam activation (33% saturated $H_2O/N_2$, 900° C., 1 hr)

TABLE 2

|  |  |  | Example | | Comparative Example | | | | |
| --- | --- | --- | --- | --- | --- | --- | --- | --- | --- |
|  |  |  | 10 | 11 | 8 | 9 | 10 | 11 | 12 |
| Blend | Carbon material | Type | MF | MF | MF | MF | MF | MF | MF |
|  |  | [g] | 20 | 20 | 20 | 20 | 20 | 20 | 20 |
|  | Ferric chloride | [g] | 1.94 | 1.94 | — | 1.94 | 1.94 | — | — |
|  | Sodium acetate | [g] | 1.76 | 1.76 | — | — | — | 1.76 | 1.76 |
|  | Acetone | [g] | — | 2.50 | — | — | 2.50 | — | 2.50 |
|  | Potassium hydroxide | [g] | 40 | 40 | 40 | 40 | 40 | 40 | 40 |
| Porous carbon material | Yield | [%] | 86.4 | 82.7 | 81.9 | 83.6 | 76.1 | 82.4 | 83.2 |
|  | Volume specific surface | [m²/cm³] | 1017 | 1020 | 944 | 954 | 964 | 853 | 786 |
|  | Weight specific surface | [m²/g] | 1667 | 1701 | 1330 | 1363 | 1397 | 1094 | 959 |
|  | Pore diameter | [nm] | 2.04 | 2.00 | 2.01 | 1.96 | 1.96 | 1.96 | 2.00 |
|  | Packing density | [g/cm³] | 0.61 | 0.6 | 0.71 | 0.7 | 0.69 | 0.78 | 0.82 |
| Capacitor | Capacitance per mass | [F/g] | 35.6 | 35.4 | 15.8 | 24.8 | 25.2 | 20.9 | 21.6 |
|  | Capacitance per volume | [F/cm³] | 21.7 | 21.2 | 11.2 | 17.4 | 17.4 | 16.3 | 17.7 |

MF: Mesophase microspheres

TABLE 3

|  |  |  | Example | | | | | Comparative Example |
| --- | --- | --- | --- | --- | --- | --- | --- | --- |
|  |  |  | 12 | 13 | 14 | 15 | 16 | 13 |
| Blend | Carbon material | Type | MF | MF | MF | MF | MF | MF |
|  |  | [g] | 20 | 20 | 20 | 20 | 20 | 20 |
|  | Copper chloride | [g] | — | — | — | — | — | 1.52 |
|  | Ferrous chloride | [g] | 1.81 | — | — | — | — | — |
|  | Ferric chloride | [g] | — | 2.42 | — | — | — | — |
|  | Cobalt chloride | [g] | — | — | 2.13 | — | — | — |
|  | Manganese chloride | [g] | — | — | — | 1.78 | — | — |
|  | Nickel chloride | [g] | — | — | — | — | 2.14 | — |
|  | Sodium acetate | [g] | 2.20 | 2.20 | 2.20 | 2.20 | 2.20 | 2.20 |
|  | Acetone | [g] | 3.12 | 3.12 | 3.12 | 3.12 | 3.12 | 3.12 |
|  | Potassium hydroxide | [g] | 40 | 40 | 40 | 40 | 40 | 40 |
| Porous carbon material | Yield | [%] | 81.9 | 84.2 | 82.2 | 79.1 | 77.9 | 84.1 |
|  | Volume specific surface | [m²/cm³] | 1040 | 1046 | 1071 | 1063 | 1037 | 959 |
|  | Weight specific surface | [m²/g] | 1762 | 1803 | 1816 | 1832 | 1820 | 1499 |
|  | Pore diameter | [nm] | 1.99 | 2.04 | 2.05 | 2.00 | 2.00 | 2.00 |
|  | Packing density | [g/cm³] | 0.59 | 0.58 | 0.59 | 0.58 | 0.57 | 0.64 |

TABLE 3-continued

|  |  |  | Example | | | | | Comparative Example |
|---|---|---|---|---|---|---|---|---|
|  |  |  | 12 | 13 | 14 | 15 | 16 | 13 |
| Capacitor | Capacitance per mass | [F/g] | 34.1 | 34.6 | 35.6 | 38.2 | 37.1 | 23.6 |
|  | Capacitance per volume | [F/cm$^3$] | 20.2 | 20.0 | 21.0 | 22.1 | 21.3 | 15.0 |

MF: Mesophase microspheres

TABLE 4

|  |  |  |  | Examples | | |
|---|---|---|---|---|---|---|
|  |  |  |  | 17 | 18 | 19 |
| Blend | Carbon material | Type |  | MF | MF | MF |
|  |  | Adding amount |  | 20 | 20 | 20 |
|  | Ferric chloride |  | [g] | 1.94 | 1.94 | 1.94 |
|  | Acetic acid |  | [g] | 1.29 | — | — |
|  | Citric acid |  | [g] | — | 1.51 | — |
|  | Benzoic acid |  | [g] | — | — | 2.63 |
|  | Acetone |  | [g] | 3.12 | 3.12 | 3.12 |
|  | Potassium hydroxide |  | [g] | 40 | 40 | 40 |
| Porous carbon material | Yield |  | [%] | 83.4 | 86.1 | 81.2 |
|  | Volume specific surface |  | [m$^2$/cm$^3$] | 1183 | 1022 | 1017 |
|  | Weight specific surface |  | [m$^2$/g] | 2191 | 1623 | 1614 |
|  | Pore diameter |  | [nm] | 2.07 | 1.92 | 1.96 |
|  | Packing density |  | [g/cm$^3$] | 0.54 | 0.63 | 0.63 |
| Capacitor | Capacitance per mass |  | [F/g] | 39.5 | 34.4 | 34.6 |
|  | Capacitance per volume |  | [F/cm$^3$] | 20.5 | 20.9 | 21.8 |

MF: Mesophase microspheres

INDUSTRIAL APPLICABILITY

According to the present invention, a porous carbon material having a specific surface area per unit volume of 1000 m$^2$/cm$^3$ or more can be industrially produced in high yield and at low cost. The packing density of the porous carbon material can also be increased, and thus the use of the porous carbon material as a polarizable electrode material permits the achievement of not only a high capacitance per unit mass but also a high capacitance per unit volume. Therefore, the porous carbon material can be used for various applications required to have these properties. Particularly, the porous carbon material is suitably used as an electrode material for an electrical double layer capacitor required to increase energy density.

What is claimed is:

1. A method of producing a porous carbon material comprising activating a soft carbon-type carbon material with alkali in the presence of a carboxylic acid ion and at least one metal ion selected from the group consisting of iron ions, cobalt ions, manganese ions and nickel ions.

2. A method of producing a porous carbon material according to claim 1, wherein the soft carbon-type carbon material comprises at least one material selected from mesophase microspheres and bulk mesophases.

3. A method of producing a porous carbon material according to claim 1, wherein the metal ion is supplied by a metal chloride.

4. A method of producing a porous carbon material according to claim 1, wherein the carboxylic acid ion is at least one type selected from an acetic acid ion, a citric acid ion and a benzoic acid ion.

5. A porous carbon material obtained by a production method according to any one of claims 1 to 4, wherein the porous carbon material has a surface area per volume of 1000 m$^2$/cm$^3$ or more.

6. A porous carbon material according to claim 5, wherein the packing density obtained by a predetermined packing method is 0.5 g/cm$^3$ or more.

7. An electrical double layer capacitor comprising a porous carbon material according to claim 5 used as a polarizable electrode material.

8. An electrical double layer capacitor according to claim 7, wherein the capacitance per unit volume is 20 F/cm$^3$ or more.

* * * * *

UNITED STATES PATENT AND TRADEMARK OFFICE
CERTIFICATE OF CORRECTION

PATENT NO. : 6,768,631 B2
DATED : February 27, 2004
INVENTOR(S) : Uechara et al.

It is certified that error appears in the above-identified patent and that said Letters Patent is hereby corrected as shown below:

<u>Column 9,</u>
Line 27, after "$(C_2H_5)$" (second occurrence), please insert -- $_4PPF_5$, $(C_2H_5)_4PCF_3 SO_3$, --.

Signed and Sealed this

Fifteenth Day of February, 2005

JON W. DUDAS
*Director of the United States Patent and Trademark Office*